(12) United States Patent
Ikeo et al.

(10) Patent No.: US 9,372,323 B2
(45) Date of Patent: Jun. 21, 2016

(54) LENS BARREL

(71) Applicant: PANASONIC INTELLECTUAL PROPERTY MANAGEMENT CO., LTD., Osaka-shi, Osaka (JP)

(72) Inventors: Kenji Ikeo, Osaka (JP); Masahiro Inata, Hyogo (JP); Hideo Onishi, Osaka (JP); Takayuki Hayashi, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/735,163

(22) Filed: Jun. 10, 2015

(65) Prior Publication Data

US 2015/0277080 A1 Oct. 1, 2015

Related U.S. Application Data

(63) Continuation of application No. PCT/JP2014/003568, filed on Jul. 4, 2014.

(30) Foreign Application Priority Data

Sep. 30, 2013 (JP) .................................. 2013-203341

(51) Int. Cl.
*G02B 27/00* (2006.01)
*G02B 7/04* (2006.01)
(Continued)

(52) U.S. Cl.
CPC .. *G02B 7/04* (2013.01); *G02B 7/08* (2013.01); *G02B 7/105* (2013.01); *H04N 5/225* (2013.01); *H04N 5/2254* (2013.01); *H04N 5/232* (2013.01)

(58) Field of Classification Search
CPC ........................................................ G02B 7/04
USPC ........................................................ 359/825
See application file for complete search history.

(56) References Cited

U.S. PATENT DOCUMENTS 4,456,342 A 6/1984 Muryoi
4,645,310 A 2/1987 Kohmoto
(Continued)

FOREIGN PATENT DOCUMENTS

JP S57-66425 A 4/1982
JP S59-48718 A 3/1984
(Continued)

OTHER PUBLICATIONS

A PCT/JP2014/003567 International Search Report issued on Oct. 7, 2014.
(Continued)

*Primary Examiner* — James Jones
(74) *Attorney, Agent, or Firm* — Shinjyu Global IP

(57) ABSTRACT

Embodiments of a lens barrel may comprise an imaging optical system with a plurality of lenses, a cylindrical focusing manipulation component, a stationary frame, and a restrictor. The focusing manipulation component changes the focal position of the imaging optical system by turning operation around the optical axis of the imaging optical system and to set the distance up to a second imaging region that is at least partially different from a first imaging region, and to move at least some of the lenses of the imaging optical system to switch between first and second imaging states. The restrictor restricts the rotatable range of the focusing manipulation component. When the focusing manipulation component is turned, its rotatable range is switched from a first rotatable range to a second rotatable range.

7 Claims, 10 Drawing Sheets

(51) Int. Cl.
 *G02B 7/105* (2006.01)
 *H04N 5/225* (2006.01)
 *H04N 5/232* (2006.01)
 *G02B 7/08* (2006.01)

(56) References Cited

U.S. PATENT DOCUMENTS

| | | | |
|---|---|---|---|
| 4,720,182 A | 1/1988 | Imanari | |
| 6,490,099 B2* | 12/2002 | Sasaki | G02B 7/102 |
| | | | 359/699 |
| 7,493,033 B2 | 2/2009 | Triteyaprasert et al. | |
| 2006/0140608 A1 | 6/2006 | Triteyaprasert et al. | |
| 2010/0027139 A1* | 2/2010 | Terada | G02B 7/102 |
| | | | 359/823 |

FOREIGN PATENT DOCUMENTS

| | | |
|---|---|---|
| JP | S60-14210 A | 1/1985 |
| JP | S60-66216 A | 4/1985 |
| JP | S60-145411 U | 9/1985 |
| JP | S61-113015 A | 5/1986 |
| JP | S63-8712 U | 1/1988 |
| JP | H06-67077 A | 3/1994 |
| JP | H06-294920 A | 10/1994 |
| JP | 2006-184816 A | 7/2006 |

OTHER PUBLICATIONS

A PCT/JP2014/003568 International Search Report issued on Oct. 7, 2014.

* cited by examiner

LENS BARREL

CROSS-REFERENCE TO RELATED APPLICATIONS

This application is a continuation of PCT Application No. PCT/JP/2014/003568 filed on Jul. 4, 2014 which claims priority to Japanese Patent Application No. 2013-203341 filed on Sep. 30, 2013. The entire disclosures of PCT Application No. PCT/JP/2014/003568 and Japanese Patent Application No. 2013-203341 are hereby incorporated herein by reference.

BACKGROUND

1. Technical Field

The present disclosure relates to a lens barrel.

2. Description of the Related Art

Patent Literature 1 (Japanese Laid-Open Patent Application S57-66425) discloses a lens barrel that uses a locking member provided to a zoom ring to adjust the movable range of a focus ring.

SUMMARY

The present disclosure provides a lens barrel capable of switching between first imaging (normal imaging) and second imaging (macro imaging), in which a scale display of the focus ring is possible, and the movable range of the focus ring can be adjusted by a mechanical end.

The lens barrel disclosed herein comprises an imaging optical system including a plurality of lenses, a cylindrical focusing manipulation component, a stationary frame, and a restrictor. The cylindrical focusing manipulation component changes the focal position of the imaging optical system by turning operation around the optical axis of the imaging optical system and to set the distance up to a second imaging region, beyond the close distance position of a first imaging region, and moves at least some of the lenses of the imaging optical system to switch between a first imaging state and a second imaging state. The stationary frame supports the focusing manipulation component in a rotatable state. The restrictor restricts the rotatable range of the focusing manipulation component in the first imaging state and the second imaging state. When the focusing manipulation component is turned to switch from the first imaging state to the second imaging state, the rotatable range of the focusing manipulation component restricted by the restrictor is switched from a first rotatable range corresponding to the first imaging state to a second rotatable range in which the position is shifted in the peripheral direction from that of the first rotatable range, corresponding to the second imaging state.

Effects

The lens barrel disclosed herein can be switched between first imaging and second imaging, can give a scale display of the focus ring, and can adjust the movable range of the focus ring with a mechanical end.

DETAILED DESCRIPTION OF THE PREFERRED EMBODIMENTS

Embodiments will now be described in detail through reference to the drawings as needed. However, some unnecessarily detailed description may be omitted. For example, detailed description of already known facts or redundant description of components that are substantially the same may be omitted. This is to avoid unnecessary repetition in the following description, and facilitate an understanding on the part of a person skilled in the art.

The inventors have provided the appended drawings and the following description so that a person skilled in the art might fully understand this disclosure, but do not intend for these to limit what is discussed in the patent claims.

Embodiment 1

Embodiment 1 will now be described through reference to FIGS. 1 to 6.
1-1. Overall Configuration of Digital Camera (see FIGS. 1 to 3)

Figure 1:
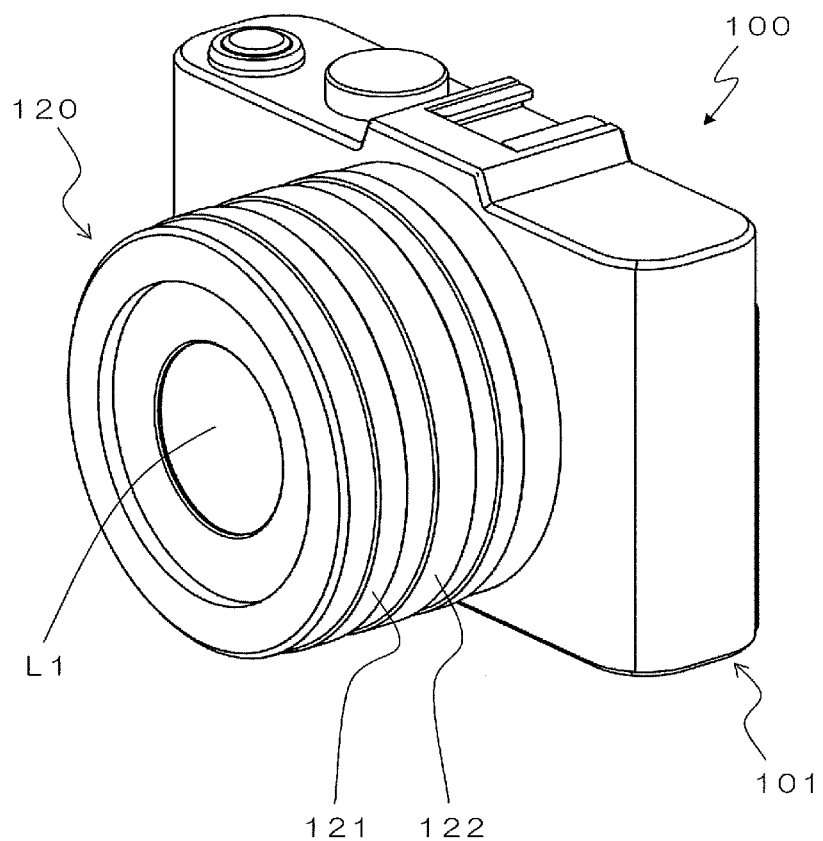
FIG. 1 is an overall oblique view of the imaging device disclosed herein.
Figure 2:
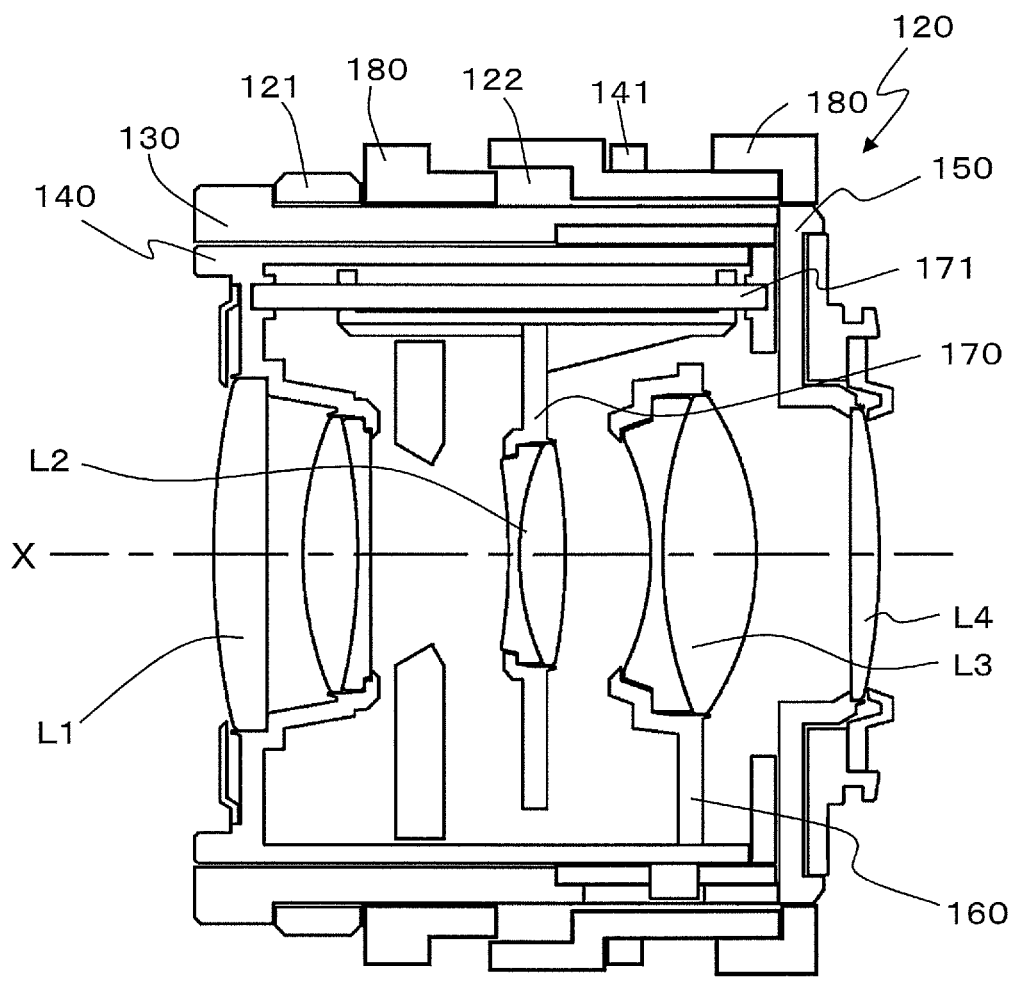
FIG. 2 is a simplified cross section of the lens barrel during normal imaging in Embodiment 1.
Figure 3:
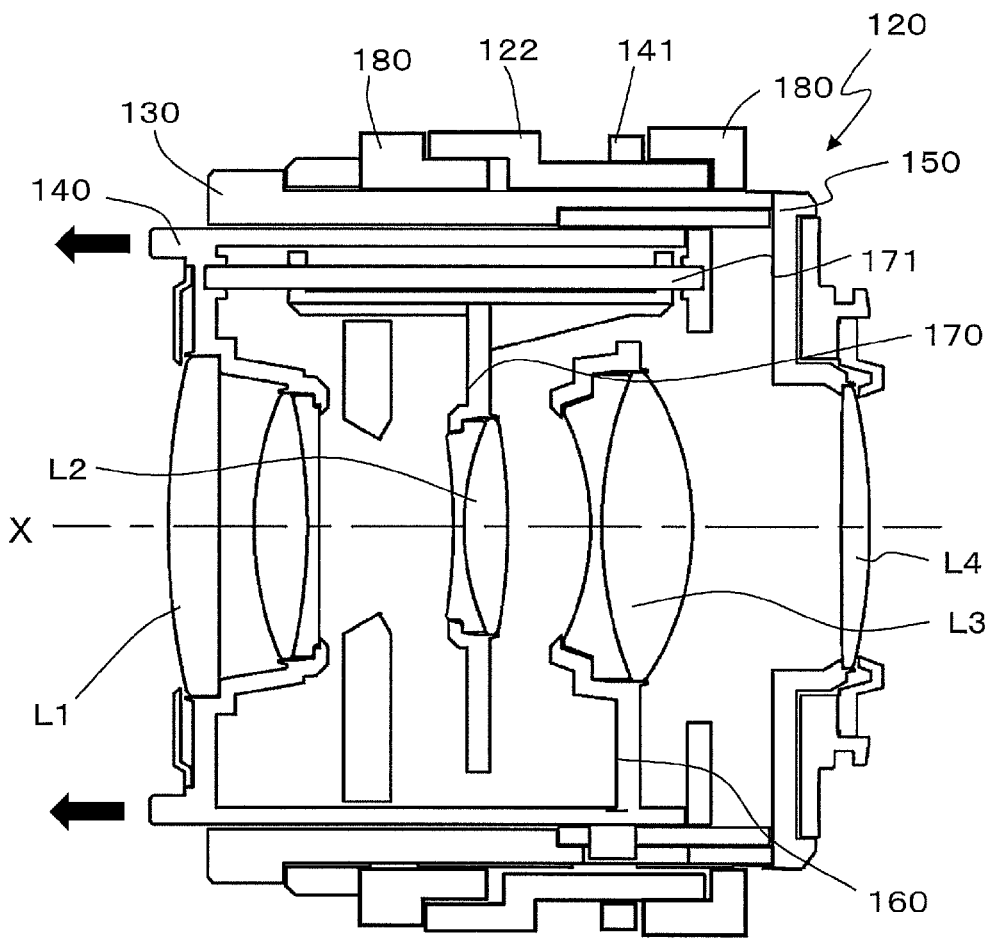
FIG. 3 is a simplified cross section of the lens barrel during macro imaging in Embodiment 1.

FIG. 1 is an overall oblique view of an imaging device 100 in this embodiment. FIG. 2 is a cross section of a lens barrel 120 in normal mode (the first imaging state). FIG. 3 is a cross section of the lens barrel 120 in macro mode (the second imaging state).

The imaging device 100 has a camera body 101 and the lens barrel 120 that is mounted to the camera body 101. The lens barrel 120 may be provided integrally with the imaging device 100, or may be removable.

The lens barrel 120 in this embodiment is designed so that a focus ring 122 (focusing manipulation component) can be turned to switch between a normal imaging mode and a macro imaging mode, and is also able to perform focusing.

The lens barrel 120 comprises a first lens group L1, a focus lens group L2, a third lens group L3, a fourth lens group L4, a stop down ring 121, the focus ring 122, a stationary frame 130, a rectilinear frame 140, a base frame 150, a three-group support frame 160, a focus lens frame 170, a guide shaft 171, and a cosmetic ring 180.

The lens barrel 120 is configured such that various members are attached to the base frame 150.

The base frame 150 supports the fourth lens group L4 at the end where the camera body 101 is mounted. The base frame 150 has the stationary frame 130 screwed to the end on the subject side.

The various members provided on the inner peripheral side of the cylindrical stationary frame 130 will now be described.

The rectilinear frame 140 is attached on the inner peripheral side of the stationary frame 130 in a state of being able to move in the optical axis X direction.

The rectilinear frame 140 is a cylindrical member that has a positioning pin (protrusion) 141 sticking out radially from the outer peripheral face.

The positioning pin 141 is engaged with a pin movement hole 122M formed in the focus ring 122.

Consequently, when the focus ring 122 is turned, the rectilinear frame 140 moves back and forth in the optical axis X direction. These mechanisms will be described in detail below.

As shown in FIGS. 1 and 2, the rectilinear frame 140 supports the first lens group L1 at the end on the subject side. The three-group support frame 160 is fixed on the inner peripheral face side of the rectilinear frame 140.

The three-group support frame 160 supports the third lens group L3.

The guide shaft 171, which is disposed parallel to the optical axis X, is provided on the inner peripheral face side of the rectilinear frame 140. The focus lens frame 170 is attached to the guide shaft 171 provided on the inner peripheral face side of the rectilinear frame 140, in a state of being able to move in the optical axis X direction.

The focus lens frame 170 supports the focus lens group L2. The focus lens frame 170 mates with the guide shaft 171, which is supported parallel to the optical axis X by the rectilinear frame 140, and is driven in the optical axis X direction by a power supply (not shown).

The various members provided on the outer peripheral side of the stationary frame 130 will now be described.

The stop down ring 121, the focus ring 122, and the cosmetic ring 180, which are circular ring-shaped members and are turned around the optical axis X, are provided on the outer peripheral side of the stationary frame 130.

The stop down ring 121 and the focus ring 122 are turned by the user in a peripheral direction around the optical axis X, with respect to the stationary frame 130.

The rotatable ranges of the stop down ring 121 and the focus ring 122 are each limited. The rotatable ranges of these members will be discussed below.

The operation of the imaging device 100 configured as above will now be described.

The imaging device 100 is configured to change the subject distance range at which imaging is possible during switching between normal mode and macro mode (for example, macro mode is 0.15 to 0.35 meter, and normal mode is from 0.3 meter to infinity).

Therefore, the imaging device 100 adjusts the movable range (rotatable range) of the focus ring 122 according to switching between normal mode and macro mode. Since the movable range of the focus ring 122 is changed, the focus ring 122 is able to move within the range of the subject distance markings made on the lens barrel 120 to match the subject distance at which imaging is possible.

This mechanism will now be described in detail.

1-2. Detailed Configuration

The detailed configuration of the lens barrel 120 pertaining to this embodiment will now be described through reference to FIGS. 4A to 6.

With the lens barrel 120 in this embodiment, the mode is switched by turning the ring-shaped focus ring 122 (focusing manipulation component) around the optical axis X.

Figure 5A:
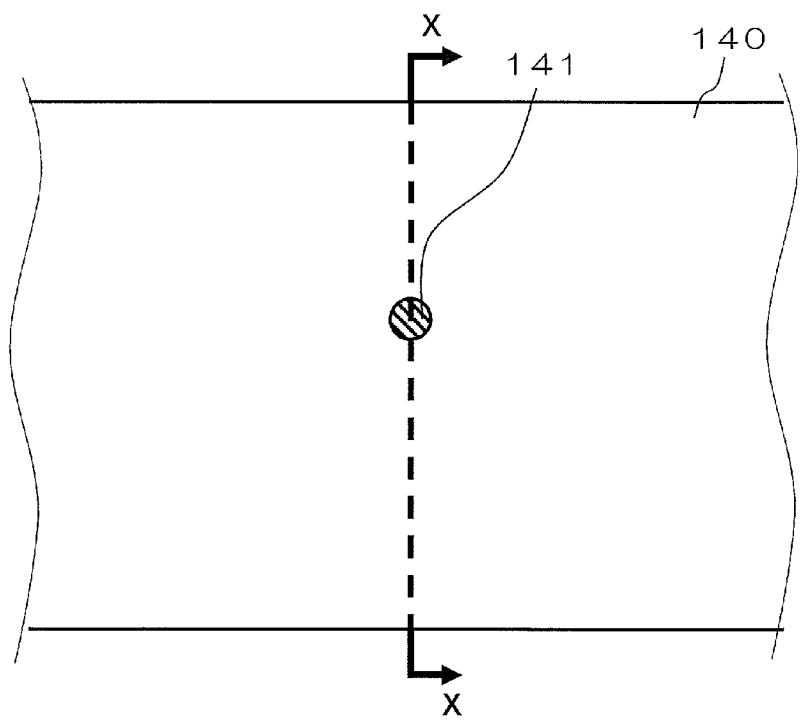
FIG. 5A is a simplified developed view of a rectilinear frame in Embodiment 1.
Figure 5B:
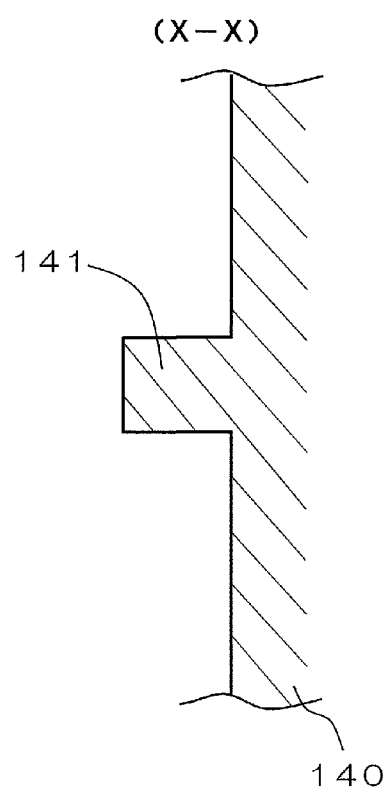
FIG. 5B shows part of a cross section at the meridional surface of the rectilinear frame.

FIG. 5A is a developed view of the rectilinear frame 140 as seen from the outer peripheral side. FIG. 5B is an X-X cross section of FIG. 5A, and is a partial cross section cut along the meridional surface of the rectilinear frame 140. "Meridional surface" means a surface that includes the optical axis and an off-axis object point of the lens.

Figure 6:
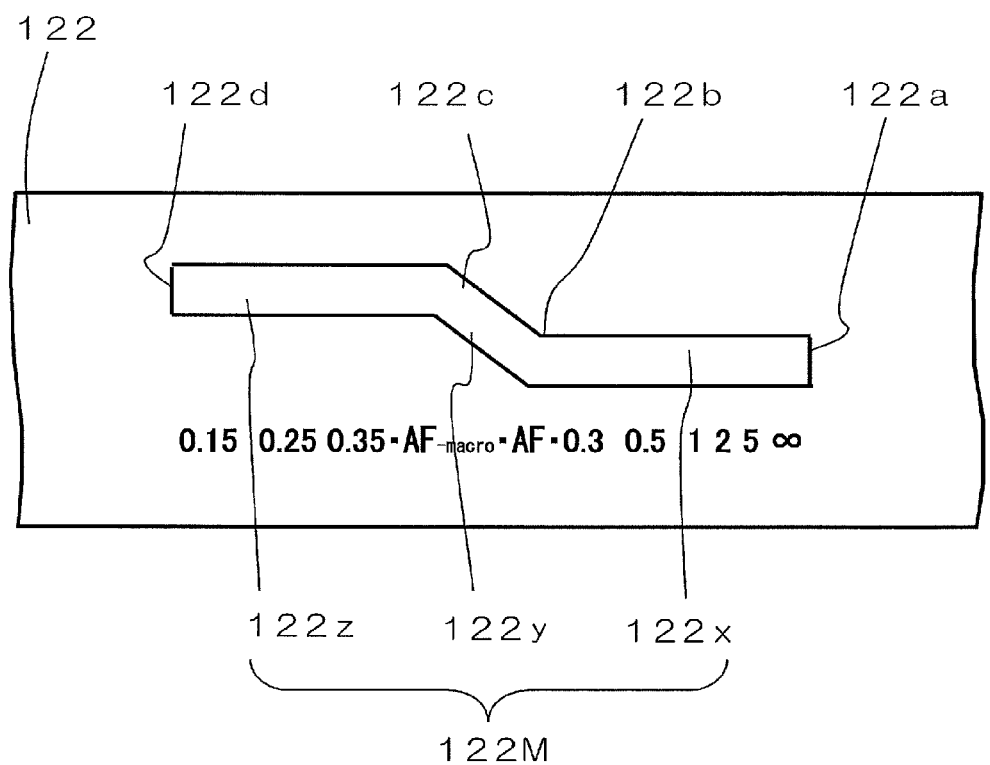
FIG. 6 is a developed view of a focus ring in Embodiment 1.

FIG. 6 is a developed view of the focus ring 122 disposed on the outer peripheral side of the rectilinear frame 140, as seen from the outer peripheral side. Components disposed on the inner peripheral side of the focus ring 122 are indicated by dotted lines.

As shown in FIGS. 5A and 5B, the rectilinear frame 140 has the positioning pin 141, which is formed so as to stick out radially from the outer peripheral face of the rectilinear frame 140.

As shown in FIGS. 4A to 4D and FIG. 6, the positioning pin 141 moves in a state of being engaged with a through-hole (the pin movement hole 122M) formed in the focus ring 122. The position of the positioning pin 141 here points to a subject distance printed on the outer peripheral face of the focus ring 122.

The pin movement hole 122M (restrictor) moves when the positioning pin 141 is inserted, and as shown in FIG. 6, has a normal rotation hole 122x, a switching cam hole 122y, and a macro rotation hole 122z.

In this embodiment, the pin movement hole 122M is formed as a hole that goes all the way through the focus ring 122 from the inner peripheral side to the outer peripheral side, but may instead be a groove formed on the inner peripheral side of the focus ring 122.

As shown in FIG. 6, the normal rotation hole 122x (first restrictor) is formed over a specific range along the peripheral direction around the optical axis X, and restricts the range of the subject distance (the first rotatable range) in normal mode.

As shown in FIG. 6, the macro rotation hole 122z (second restrictor) is formed over a specific range that is different from that of the normal rotation hole 122x, in the peripheral direction around the optical axis X.

More specifically, the macro rotation hole 122z is formed more to the subject side than the normal rotation hole 122x in the optical axis X direction. The macro rotation hole 122z restricts the range of the subject distance (the second rotatable range) in macro mode.

As shown in FIG. 6, the switching cam hole 122y (switching component) is formed at an angle to the peripheral direction on the outer peripheral face of the focus ring 122, and connects the close end of the normal rotation hole 122x with the far end of the macro rotation hole 122z.

Specifically, as shown in FIG. 6, the pin movement hole 122M is mainly made up of three regions.

These three regions are the normal rotation hole 122x in which the positioning pin 141 moves during normal mode, the macro rotation hole 122z in which the positioning pin 141 moves during macro mode, and the switching cam hole 122*y* that links the normal rotation hole 122*x* and the macro rotation hole 122*z* together.

The end of the switching cam hole 122*y* on the farthest side (the left side in the drawing) is connected to a normal close end 122*b* on the close-up side of the normal rotation hole 122*x*. The end of the switching cam hole 122*y* on the close-up side (the left side in the drawing) is connected to a macro far end 122*c* on the farthest side of the macro rotation hole 122*z*.

Steps (not shown) may be provided to the two ends of the switching cam hole 122*y* to provide a tactile click. In this case, a spring or other such biasing means (not shown) that biases the positioning pin 141 in a specific direction may be provided so that the pin is biased by the biasing means at the location of a step, causing it to give a tactile click.

The positioning pin 141 of the rectilinear frame 140 here moves in a state of being inserted into the normal rotation hole 122*x*, the switching cam hole 122*y*, and the macro rotation hole 122*z*.

The outer peripheral face of the focus ring 122 is printed with markings of "0.15 0.25 0.35·AF-Macro·AF·0.3 0.5 1 2 5 ∞," which indicate the focal distance.

1-3. Switching Between Normal Mode and Macro Mode

Switching between normal mode and macro mode will now be described through reference to FIGS. 4A to 4D.

Figure 4A:
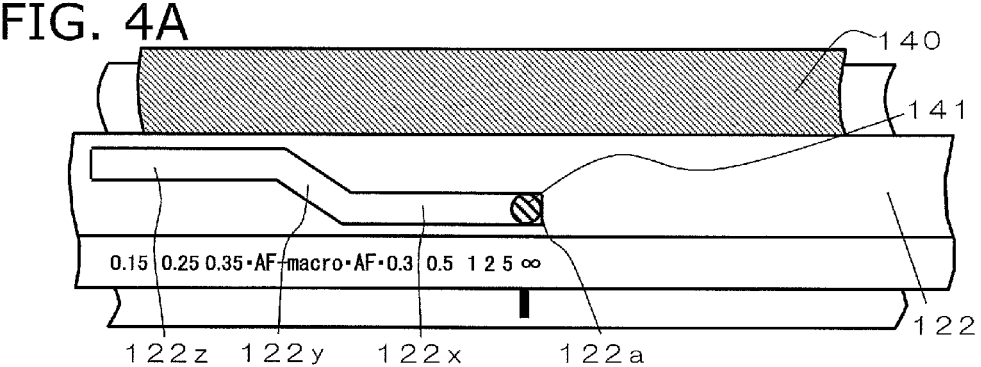
FIG. 4A shows focus markings when the subject is at a far distance during normal imaging in Embodiment 1.
Figure 4B:
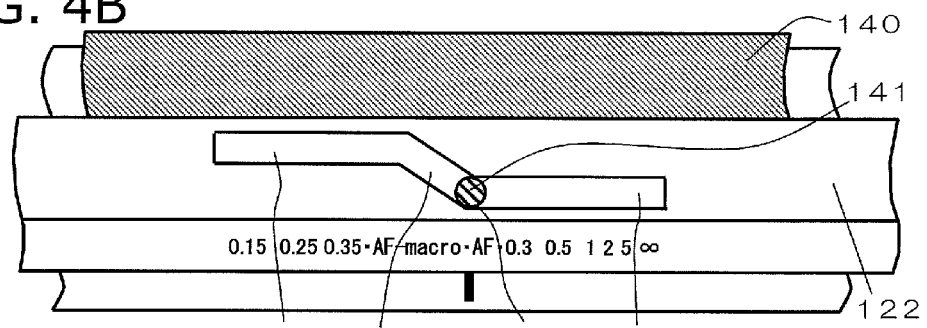
FIG. 4B shows focus markings when AF has been selected during normal imaging in Embodiment 1.
Figure 4C:
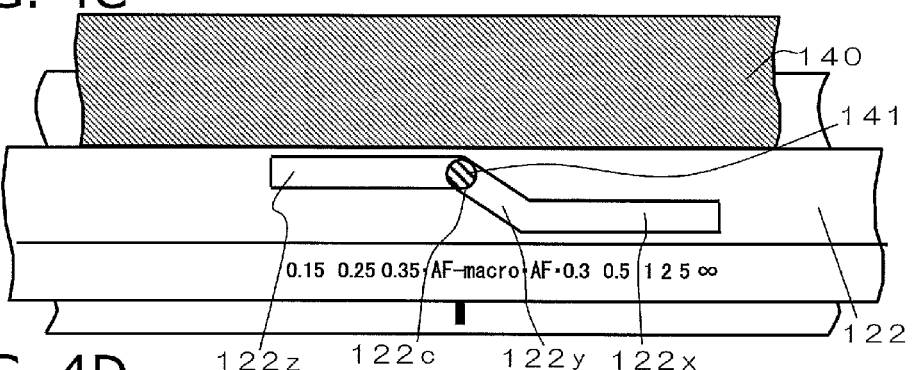
FIG. 4C shows focus markings when AF has been selected during macro imaging in Embodiment 1.
Figure 4D:
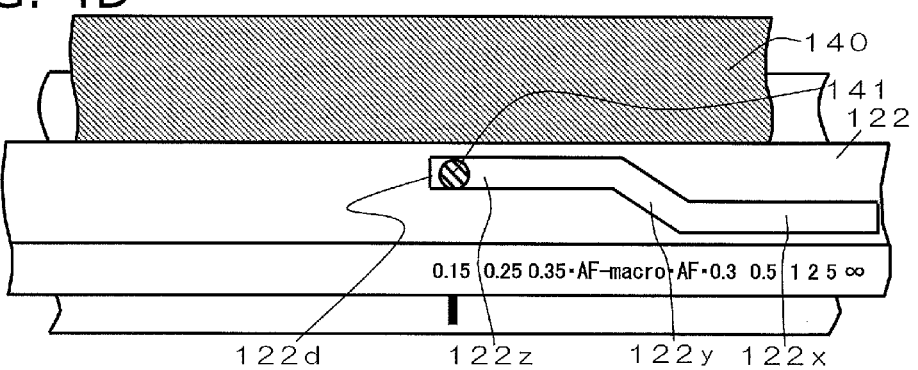
FIG. 4D shows focus markings when the subject is at a close distance during macro imaging in Embodiment 1.

FIGS. 4A and 4B show the focal state of the focus ring 122 in normal mode. FIGS. 4C and 4D show the focal state of the focus ring 122 in macro mode.

With the lens barrel in this embodiment, the user switches between normal mode and macro mode by turning the focus ring 122.

More specifically, switching between normal mode and macro mode is accomplished by turning the focus ring 122 in a state in which the positioning pin 141 provided to the rectilinear frame 140 is engaged with the switching cam hole 122*y* of the focus ring 122.

Since the switching cam hole 122*y* here is formed at an angle to the peripheral direction, when the focus ring 122 is turned, the positioning pin 141 moves back and forth in the optical axis X direction.

That is, when the positioning pin 141 moves in the switching cam hole 122*y* (between the normal close end 122*b* and the macro far end 122*c*), the rectilinear frame 140, which is constituted integrally with the positioning pin 141, moves in the optical axis X direction (see FIGS. 4B and 4C).

When the rectilinear frame 140 moves forward (to the subject side) in the optical axis X direction, the mode changes to macro mode as shown in FIG. 3. In macro mode, as compared to the normal mode shown in FIG. 2, the first lens group L1, the focus lens group L2, and the third lens group L3 move forward, increasing their distance from the fourth lens group L4.

This makes it possible to switch from the normal mode shown in FIG. 2 to the macro mode shown in FIG. 3 by moving the rectilinear frame 140 back and forth with respect to the focus ring 122 in the optical axis X direction.

1-4. Adjustment of Movable Range (Rotatable Range) of Focus Ring

As shown in FIGS. 4A and 4B, the movable range of the focus ring 122 in normal mode is the range from a normal far end 122*a* of the normal rotation hole 122*x* to the end on the farthest side of a normal close end 122*b*. In other words, the positioning pin 141 of the rectilinear frame 140 moves over a range from the position shown in FIG. 4A to the position shown in FIG. 4B.

As shown in FIGS. 4A and 4B, the range of the marking display in normal mode is "AF·0.3 to ∞."

Also, as shown in FIGS. 4C and 4D, the rotatable range of the focus ring 122 in macro mode is from the macro far end 122*c* on the farthest side of the macro rotation hole 122*z* to a macro close end 122*d*. In other words, the positioning pin 141 of the rectilinear frame 140 moves over a range from the position shown in FIG. 4C to the position shown in FIG. 4D.

As shown in FIGS. 4C and 4D, the range of the markings in macro mode is "0.15 to 0.35·AF-Macro."

1-5. Effect

As discussed above, with the lens barrel 120 in this embodiment, in switching from the normal mode to the macro mode, the movable range (rotatable range) of the focus ring 122 can be easily changed merely by turning the focus ring 122.

Other Embodiments

In the above embodiment, an example was given in which numerical values serving as markers printed on the outer peripheral face of the focus ring 122 were arranged in a single row, but the technology disclosed herein is not limited to this.

For example, a configuration may be employed in which a numerical value range corresponding to normal mode and a numerical value range corresponding to macro mode are arranged in different rows on the outer peripheral face of a member that is on the stationary side during mode switching, and a window that exposes just one row of these numerical value ranges to the outside is formed in a member that is on the moving side during mode switching.

This configuration allows the numerical value range displayed through the window to be switched to the range corresponding to each mode when the mode is switched.

Embodiment 2

Embodiment 2 will now be described through reference to FIGS. 7A to 10B.

Just as in Embodiment 1 above, with a lens barrel 220 in Embodiment 2, the focus ring and the macro ring are configured as a single ring member (the focus ring 222), and this member is used to perform mode switching.

The configuration will now be described in detail.

2-1. Detailed Configuration

Figure 10A:
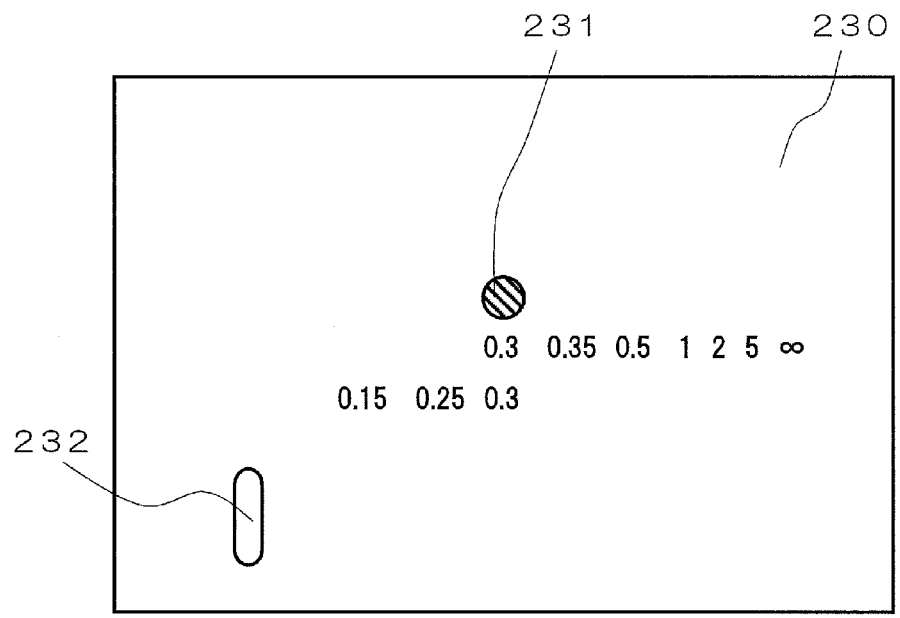
FIG. 10A is a developed view of a stationary frame in Embodiment 2.
Figure 10B:
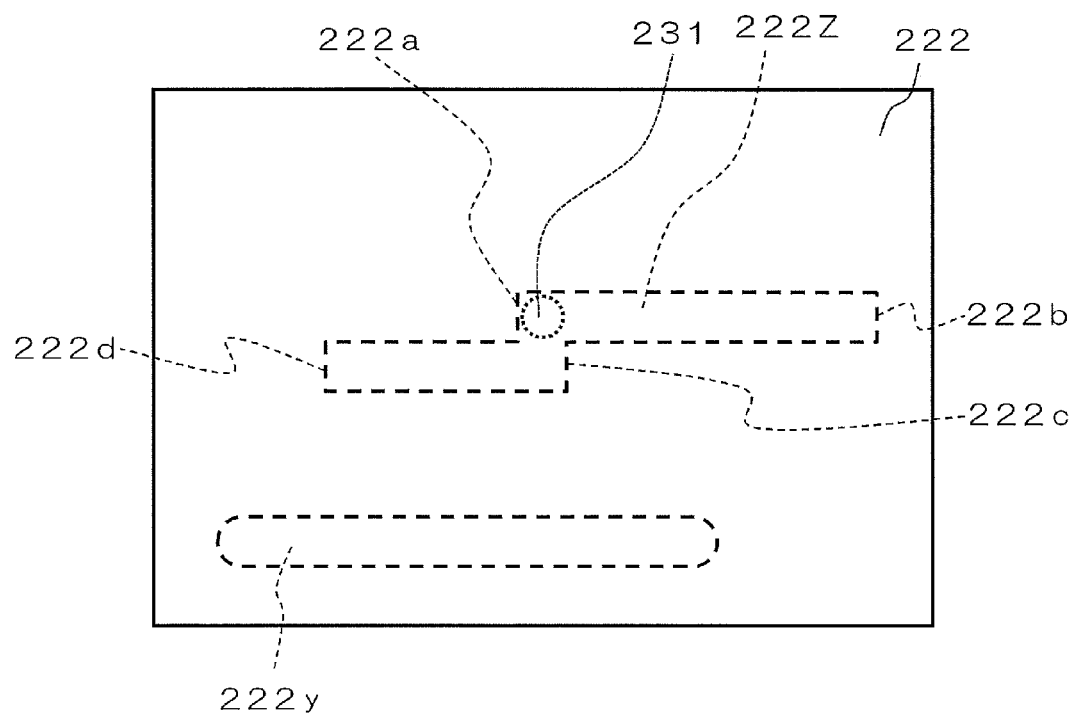
FIG. 10B is a developed view of a focus ring in Embodiment 2.

FIG. 10A is a developed view of a stationary frame 230 as seen from the outer peripheral side, and FIG. 10B is a developed view of the focus ring 222 (focusing manipulation component) as seen from the outer peripheral side. Components disposed on the inner peripheral face side are indicated by dotted lines.

The stationary frame 230 has a rectilinear groove 232 formed along the optical axis X direction, and a positioning pin 231 that sticks out from the outer peripheral face radially.

Figure 9A:
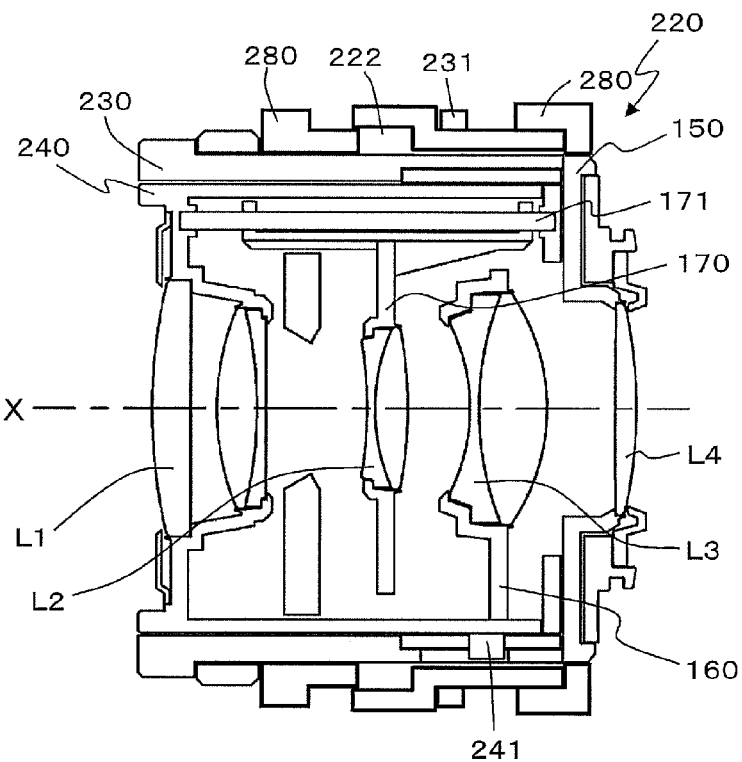
FIG. 9A is a simplified cross section of a lens barrel during normal imaging in Embodiment 2.
Figure 9B:
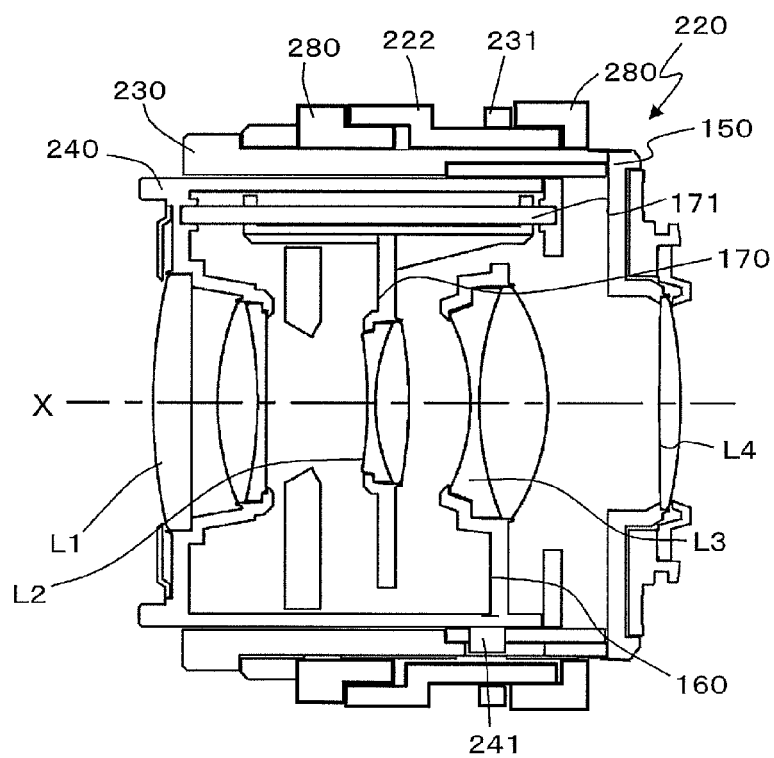
FIG. 9B is a simplified cross section of a lens barrel during macro imaging in Embodiment 2.

As shown in FIGS. 9A and 9B, the focus ring 222 is disposed on the outer peripheral face side of the stationary frame 230. The focus ring 222 has a projection engagement groove 222*y* that engages with a projection 241 of a rectilinear frame 240, and a pin movement hole 222*z* in which the positioning pin 231 of the stationary frame 230 engages.

The pin movement hole 222*z* is formed in the shape of two steps in which the ends of two grooves extending in the peripheral direction at positions shifted in the optical axis X direction in the outer peripheral face of the focus ring 222, are linked by a groove formed along the direction of the optical axis X. The pin movement hole 222*z* has a normal close end 222*a*, a normal far end 222*b*, a macro far end 222*c*, and a macro close end 222*d*.

The normal close end 222a and the normal far end 222b are two ends that restrict the rotatable range of the focus ring 222 in normal mode.

The macro far end 222c and the macro close end 222d are two ends that restrict the rotatable range of the focus ring 222 in macro mode.

The outer peripheral face of the focus ring 222 is printed with markings of "0.15 0.25 0.3 0.35 0.5 1 2 5 ∞" indicating the subject distance.

2-2. Switching Between Normal Mode and Macro Mode

Just as in Embodiment 1 above, with the lens barrel 220 in this embodiment, the user can switch between normal mode and macro mode by operating the focus ring 222.

Figure 7A:
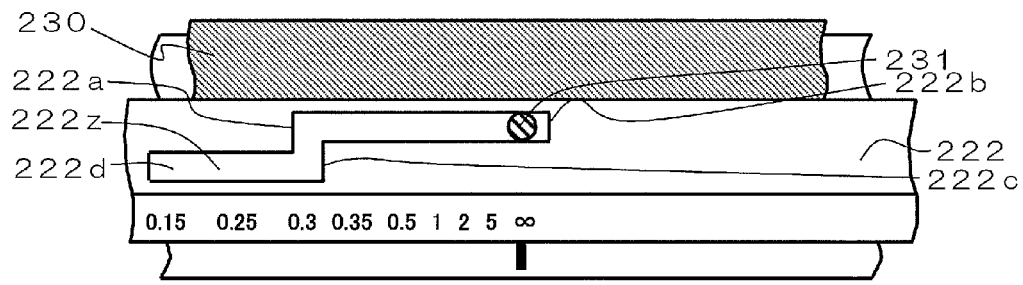
FIG. 7A shows focus markings when the subject is at a far distance during normal imaging in Embodiment 2.
Figure 7B:
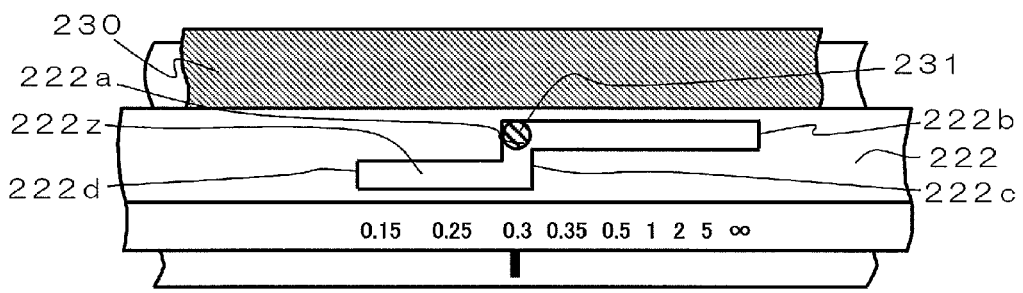
FIG. 7B shows focus markings when the subject is at a close distance during normal imaging in Embodiment 2.

More specifically, the user switches from normal mode to macro mode by pushing the focus ring 222 out to the subject side in the optical axis direction in a state in which the positioning pin 231 is touching the normal close end 222a (FIG. 7B).

Figure 7C:
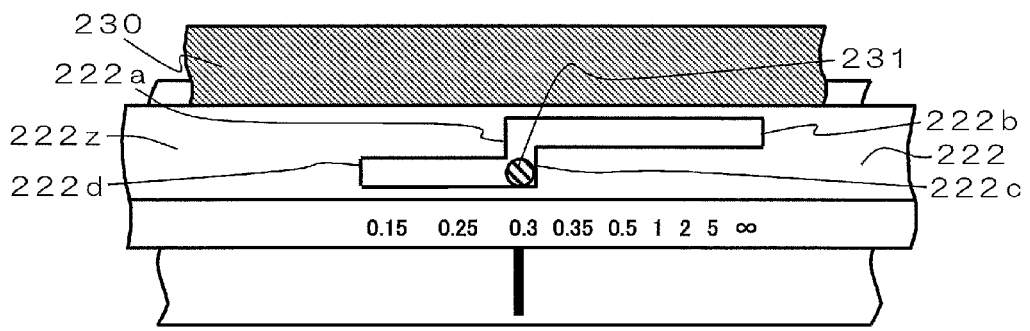
FIG. 7C shows focus markings when the subject is at a far distance during macro imaging in Embodiment 2.

At this point, the positioning pin 231 moves from a position where it is touching the normal close end 222a to a position where it is touching the macro far end 222c (FIG. 7C).

Conversely, the user switches from macro mode to normal mode by pulling in the focus ring 222 to the camera body side in the optical axis X direction from a state in which the positioning pin 231 is touching the macro far end 222c (FIG. 7C).

At this point, the positioning pin 231 moves from a position where it is touching the macro far end 222c to a position where it is touching the normal close end 222a (see FIG. 7B).

2-3. Adjustment of Movable Range (Rotatable Range) of Focus Ring

In Normal Mode

FIG. 7A shows the positional relation between the positioning pin 231 of the stationary frame 230 and the pin movement hole 222z of the focus ring 222 when focus is at infinity in normal mode. FIG. 7B shows the positional relation between the positioning pin 231 of the stationary frame 230 and the pin movement hole 222z of the focus ring 222 when focus is at close-up in normal mode.

In normal mode, the positioning pin 231 of the stationary frame 230 is able to move through a groove on the subject side of the pin movement hole 222z of the focus ring 222, that is, between the normal close end 222a and the normal far end 222b. Accordingly, the focus ring 222 is able to rotate from a position where the positioning pin 231 touches the normal close end 222a to a position where it touches the normal far end 222b.

The normal close end 222a here is the mechanical end on the close-up side, and the normal far end 222b is the mechanical end on the infinity side.

The range of the markings in normal mode is from 0.3 m to ∞, as shown in FIGS. 7A and 7B.

In Macro Mode

Figure 7D:
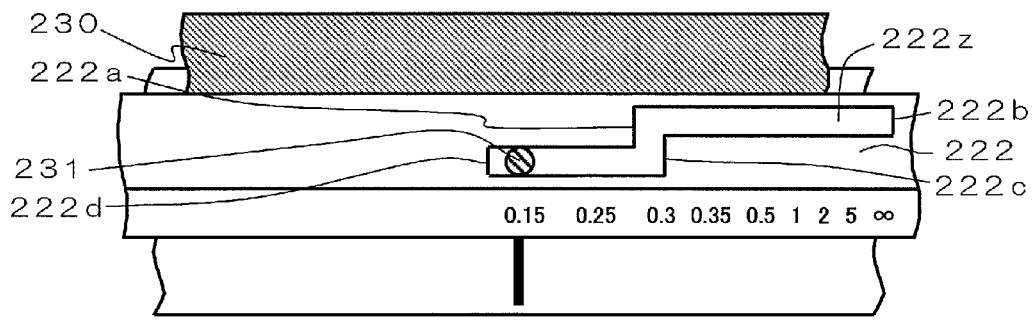
FIG. 7D shows focus markings when the subject is at a close distance during macro imaging in Embodiment 2.

FIG. 7C shows the positional relation between the positioning pin 231 of the stationary frame 230 and the pin movement hole 222z of the focus ring 222 when focus is at its farthest in macro mode. FIG. 7D shows the positional relation between the positioning pin 231 of the stationary frame 230 and the pin movement hole 222z of the focus ring 222 when focus is at its closest in macro mode.

In macro mode, the positioning pin 231 of the stationary frame 230 is able to move through a groove on the camera body side of the pin movement hole 222z of the focus ring 222, that is, between the macro far end 222c and the macro close end 222d. Accordingly, the focus ring 222 is able to rotate from a position where the positioning pin 231 touches the macro far end 222c to a position where it touches the macro close end 222d.

The macro close end 222d here is the mechanical end on the close side, and the macro far end 222c is the mechanical end on the far side.

The range of the markings in normal mode is from 0.15 to 0.3 m, as shown in FIGS. 7C and 7D.

As shown in FIGS. 7A to 7D, the marking display printed on the outer peripheral face of the focus ring 222 may be such that the close and far ends in normal mode and the close and far ends in macro mode are disposed in a single straight line. Alternatively, as shown in FIGS. 8A and 8B, the close and far ends corresponding to macro mode and normal mode may be printed on separate levels.

In this case, the marking display corresponding to each mode can be seen through a marking window hole 281 during mode switching by using a combination of a cosmetic ring 280 having the marking window hole 281 that has a width equal to one level of the printed marking display.

Figure 8A:
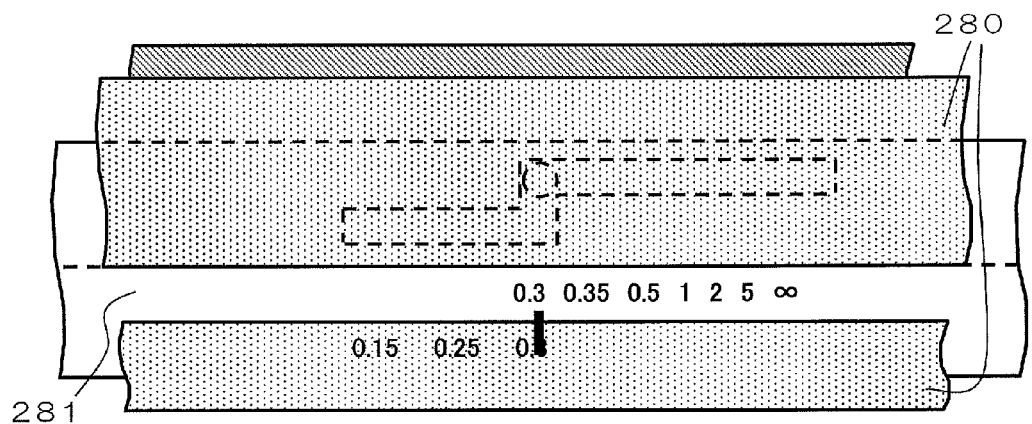
FIG. 8A shows focus markings during normal imaging in Embodiment 2.
Figure 8B:
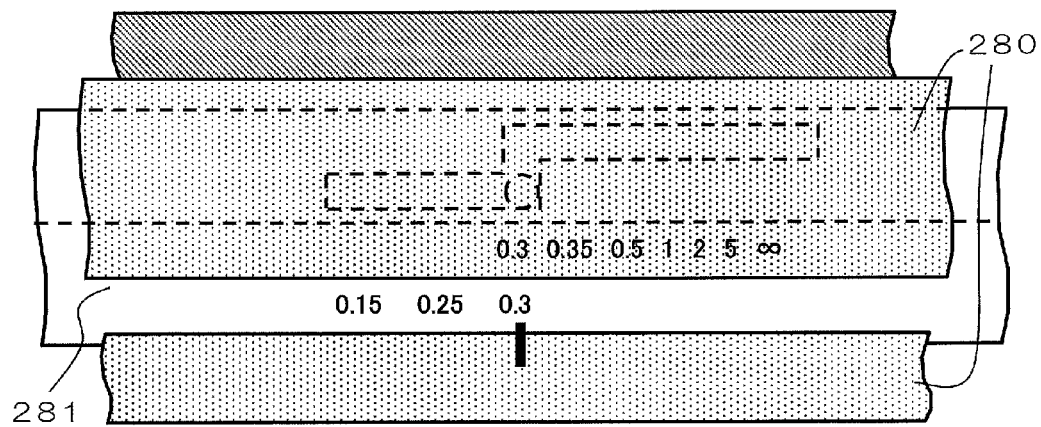
FIG. 8B shows focus markings during macro imaging in Embodiment 2.

More specifically, as shown in FIG. 8A, in normal mode only the marking display of 0.3 to ∞ disposed on the upper level is exposed. In macro mode, meanwhile, as shown in FIG. 8B, only the marking display of 0.15 to 0.3 disposed on the lower level is exposed.

2-4 Effect

As discussed above, with the lens barrel 220 in Embodiment 2, the movable range of the 22 can be changed by moving the focus ring 222 back and forth in the optical axis X direction in switching from normal mode to macro mode.

This allows the subject distance range over which imaging is possible to be restricted according to the imaging mode in question.

Furthermore, by using a combination of the cosmetic ring 280 having the marking window hole 281 that has a width equal to one level of marking display, just the subject distance range over which imaging is possible can be displayed.

Thus, with the lens barrel 220 that performs mode switching, it is possible to give a subject distance display on a marking ring corresponding to each mode.

Other Embodiments

Embodiments 1 and 2 were described above as examples of the technology disclosed herein, but the technology disclosed herein is not limited to this, and can also be applied as needed to embodiments featuring modifications, substitutions, additions, omissions, and so forth. Also, the various constituent elements described in Embodiments 1 and 2 above can be combined into new embodiments.

Embodiments were described above as examples of the technology disclosed herein, and the appended drawings and detailed description were provided to that end.

Therefore, the constituent elements illustrated in the appended drawings and discussed in the detailed description can encompass not only those constituent elements that are essential to solving the problem, but also constituent elements that are not essential to solving the problem.

Accordingly, just because these non-essential constituent elements are illustrated in the appended drawings and discussed in the detailed description, it should not be concluded that these non-essential constituent elements are essential.

Also, the above embodiments were given to illustrate examples of the technology disclosed herein, so various modifications, substitutions, additions, omissions, and so forth can be made within the scope of the patent claims or equivalents thereof.

INDUSTRIAL APPLICABILITY

The present disclosure can be applied to any lens barrel used in an imaging device. More specifically, it can be applied to a digital still camera, a single-lens reflex camera, a mirrorless camera, or the like.

The invention claimed is:
1. A lens barrel, comprising:
an imaging optical system including a plurality of lenses;
a cylindrical focusing manipulation component configured to change the focal position of the imaging optical system by turning operation around the optical axis of the imaging optical system and to set the distance up to a second imaging region that is at least partially different from a first imaging region, and to move at least some of the lenses of the imaging optical system to switch between first and second imaging states;
a stationary frame configured to support the focusing manipulation component in a rotatable state; and
a restrictor configured to restrict the rotatable range of the focusing manipulation component in the first imaging state and the second imaging state,
wherein when the focusing manipulation component is turned to switch from the first imaging state to the second imaging state, the rotatable range of the focusing manipulation component restricted by the restrictor is switched from a first rotatable range corresponding to the first imaging state to a second rotatable range in which the position is shifted in the peripheral direction from that of the first rotatable range, corresponding to the second imaging state.

2. The lens barrel according to claim 1,
wherein the restrictor has a first restrictor that restricts the first rotatable range, a second restrictor that restricts the second rotatable range, and a switching component that connects ends where the first restrictor and the second restrictor are close together, and switches between the first imaging state and the second imaging state.
3. The lens barrel according to claim 2,
wherein the first and second restrictors are formed along the peripheral direction of the focusing manipulation component, and
the switching component is formed at an angle to the peripheral direction of the focusing manipulation component.
4. The lens barrel according to claim 1,
further comprising a rectilinear frame configured to support at least some of the lenses included in the imaging optical system, to be able to move back and forth with respect to the stationary frame along the optical axis direction of the imaging optical system, and having a protrusion that sticks out from the outer peripheral face toward the outside in the radial direction,
wherein when the focusing manipulation component is turned, the protrusion of the rectilinear frame moves along the peripheral direction in a state of being mated to the restrictor.
5. The lens barrel according to claim 1,
wherein the restrictor is a groove or hole formed in part of the focusing manipulation component.
6. An imaging mode, comprising:
the lens barrel according to claim 1; and
a camera body to which the lens barrel is mounted.
7. The lens barrel according to claim 1,
wherein the second imaging region is a macro imaging region that goes beyond the close distance position of the first imaging region.

* * * * *